Figure 1A:
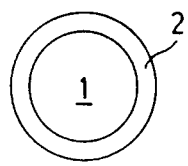

United States Patent
Piesslinger et al.

[11] 3,858,964
[45] Jan. 7, 1975

[54] LIGHT-ABSORBING SILICATE GLASS FOR FIBRE-OPTICAL ELEMENTS

[75] Inventors: Gertraud Agnes Anna Piesslinger; Hubertus M. J. J. Kunnen, both of Emmasingel, Eindhoven, Netherlands

[73] Assignee: U.S. Philips Corporation, New York, N.Y.

[22] Filed: Mar. 12, 1973

[21] Appl. No.: 339,719

Related U.S. Application Data

[60] Division of Ser. No. 224,747, Feb. 9, 1972, abandoned, which is a continuation of Ser. No. 4,318, Jan. 20, 1970, abandoned.

[30] Foreign Application Priority Data

Jan. 22, 1969  Netherlands .................. 6901020

[52] U.S. Cl. .................. 350/96 B, 106/50, 106/54
[51] Int. Cl. ..... G02b 5/14, C03c 13/00, C03c 3/04
[58] Field of Search ............... 106/54, 47 Q, 52, 50; 350/96 B

[56] References Cited
UNITED STATES PATENTS

| | | | |
|---|---|---|---|
| 2,394,493 | 2/1946 | Schoenlaub | 106/50 |
| 2,581,440 | 1/1952 | Pincus | 106/52 |
| 3,273,445 | 9/1966 | Siegmund | 350/96 B |

*Primary Examiner*—Winston A. Douglas
*Assistant Examiner*—Mark Bell

[57] ABSTRACT

Glass which is particularly suitable for a light absorbing portion of a fibre-optical element, and which has the following composition in % by weight:

| | | | | |
|---|---|---|---|---|
| $SiO_2$ | 50–70 | | CaO | 0–5 |
| $B_2O_3$ | 0–25 | | MgO | 0–8 |
| $Li_2O$ | 0–2 | | BaO | 0–5 |
| $Na_2O$ | 0–15 } combined 5–20 | | $Fe_2O_3$ | 0–10 } combined 5–15 |
| $K_2O$ | 0–10 | | $V_2O_5$ | 0–10 |
| $Al_2O_3$ | 2–4 | | $As_2O_3$ | 0–2 |

2 Claims, 2 Drawing Figures

PATENTED JAN 7 1975

3,858,964

INVENTORS
GERTRAUD A.A. PIESSLINGER
HUBERTUS M.J.J. KUNNEN
BY

AGENT

LIGHT-ABSORBING SILICATE GLASS FOR FIBRE-OPTICAL ELEMENTS

This is a division of application Ser. No. 224,747, filed Feb. 9, 1972 which was a continuation of Ser. No. 4,318, filed Jan. 20, 1970, both of which are now abandoned.

The invention relates to glass which is particularly suitable for the light-absorbing portion of a fibre-optical element.

In the last years fibre-optical elements which comprise a bundle of glass fibres having a very small diameter and serving for light transmission have often been used in cases where even images of a very weak brightness are transmitted without noticeable loss of definition due to dispersion. They are used, for example, in image intensifiers and in television camera tubes.

The operation of such a fibre is based on the fact that a beam of light which on one side impinges upon one end of the fibre remains substantially within the fibre because of total reflection on the sides of the fibre and reaches the other end at substantially the same intensity. In order to achieve this, such a fibre consists of a core of material having a high refractive index ($n_1$) which core is concentrically surrounded by a cladding of glass having a low refractive index ($n_2$). The fibres may have any shape and a constant closed cross-section, thus not only circular but also rectangular or polygonal.

It should be ensured that the loss of definition due to scattered light does not occur. To this end in the first place the critical angle $\theta$, which is the largest angle between a beam of light impinging upon the fibre-optical element and the normal on the end face of the fibre for which this beam of light is just not totally reflected, must be at a maximum. All means of light which impinge upon the end face of the fibre at an angle smaller than this critical angle pass the fibre throughout its length once they are within this fibre due to repeated total reflection on the sides. The relation $$n_o \sin \theta = \sqrt{n_1^2 - n_2^2}$$

exists between the critical angle $\theta$, the refractive indices of the two types of glass and the refractive index of the ambient medium ($n_o$).

By suitable choice of the two types of glass as regards their refractive indices this critical angle $\theta$ may be 90° in case of free arrangement of the fibre-optical element, that is to say, in air as an ambient medium. This means that, once within the fibre all light even light at a grazing incidence remains within the fibre on account of total reflection.

The principal source for scattered light is light which impinges upon one end face of the fibre-optical element on the cladding glass at an angle deviating from 0°. The cladding glass must of course have a limited minimum thickness since otherwise "crosstalk" between the fibres may occur. This minimum value is in the order of a few tenths of microns. This means that the surface of the cladding glass occupies 25 to 40 percent of the total surface in a cross-section of the fibre-optical element having a core diameter of, for example, 5 to 10 microns. In contrast with this source other errors, which occur more incidentally and cause scattered light, are of lesser influence such as errors at the boundary surface of the core and cladding and gas bubbles or crystals in the core glass and in the cladding of the fibres. Also a medium should be taken into account the refractive index ($n_o$) of which is much greater than 1, such as when an element is immersed or a layer of a photoconductor including a binder provided on the end face of a fibre-optical element. As a result the critical angle $\theta$ is considerably reduced as is apparent from the previously mentioned equation $n_o \sin \theta = \sqrt{n_1^2 - n_2^2}$.

For the purpose of absorbing scattered light it is known from the British Specification No. 1,113,229 to use a glass fibre for a fibre-optical element which comprises a transparent core portion having a high refractive index, a transparent cladding portion having a low refractive index and which surrounds the core portion, the said cladding portion consisting of glass comprising less than 2.5 percent by weight of $Na_2O$ and a light-absorbing portion which surrounds the cladding and the core.

For this purpose a borosilicate glass is known which comprises $Fe_2O_3$ in a quantity of between 2 and 10 percent by weight, $TiO_2$ in a quantity of between 2 and 10 percent by weight, and the total quantity of the said $Fe_2O_3$ and $TiO_2$ must lie between 4 and 15 percent by weight, while a total of less than 5 percent by weight of alkaline earth oxides may be present and substantially no bivalent transition metal oxides (<1 percent by weight). An example of such a glass comprises in parts by weight 67.8 $SiO_2$, 3.2 $Al_2O_3$, 19.2 $B_2O_3$, 0.4 $Na_2O$, 8.8 $K_2O$, 9.0 $Fe_2O_3$, 3.0 $TiO_2$ and 0.25 $As_2O_3$. The softening point of these types of glass lies between approximately 660° and 760°C.

A drawback of these known glasses is that they can be used only as a light-absorbing cladding in fibre-optical elements provided that the transparent cladding glass with which the light-absorbing cladding comes into contact comprises not more than 2.5 percent by weight of $Na_2O$. If the cladding glass comprises more of $Na_2O$, the black glass is discoloured by a still unknown cause during drawing out and bundling the fibres and thus it becomes inactive relative to the reduction of scattered light. The limitation to cladding glasses which do not comprise substantially any $Na_2O$ gives rise to additional difficulties. These glasses are fairly hard, that is to say, they have a fairly high softening point and their coefficient of expansion generally greatly deviates from that of the conventional core glasses.

An absorbing type of glass is needed which can be used in combination with a cladding glass of, for example, the following composition in % by weight: $SiO_2$ 60.1, $B_2O_3$ 22.6, $Al_2O_3$ 3.9 and $Na_2O$ 13.4. This glass has a refractive index $n_D = 1.50$ and a linear coefficient of expansion between 30° and 300°C of approximately $70 \times 10^{-7}$ per °C.

The present invention provides a class of glasses which meets this need. The glasses according to the invention are characterized by a composition which lies within the range limited as follows in % by weight:

| | | | | | |
|---|---|---|---|---|---|
| $SiO_2$ | 50 – 70 | | CaO | 0 – 5 | |
| $B_2O_3$ | 0 – 25 | | MgO | 0 – 8 | |
| $Li_2O$ | 0 – 2 | combined 5–20 | BaO | 0 – 5 | |
| $Na_2O$ | 0 – 15 | | $Fe_2O_3$ | 0 – 10 | combined 5–15 |
| $K_2O$ | 0 – 10 | | $V_2O_5$ | 0 – 10 | |
| $Al_2O_3$ | 2 – 4 | | $As_2O_3$ | 0 – 2 | |

Glasses are preferred the composition of which lies within the following limits:

| | | | | |
|---|---|---|---|---|
| $SiO_2$ | 50 – 65 | | CaO | 0 – 4 |
| $B_2O_3$ | 0 – 20 | | MgO | 0 – 6 |
| $Li_2O$ | 0 – 2 | | BaO | 0 – 2 |
| $Na_2O$ | 0 – 10 | combined 5–15 | $Fe_2O_3$ | 2 – 8 } combined 5–15 |
| $K_2O$ | 0 – 8 | | $V_2O_5$ | 2 – 9 |
| $Al_2O_3$ | 2 – 4 | | $As_2O_3$ | 0 – 2 |

The invention will now be described with reference to an example and a drawing.

Figure 1B:
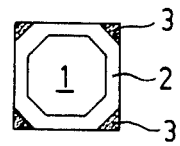

A cladding glass tube having a circular cross-section and an internal diameter of 15 mm and a wall thickness of 1 – 1.5 mm was first calibrated to a quadrangular cross-section having bevelled corners at an internal distance of 15 mm from the sides. Fibres comprising black glass of one of the compositions summarized in the Table were placed in the corners and a fitting rod of core glass was placed therein (FIGS. 1a and 1b); core glass 1 and cladding glass 2 had the following compositions in % by weight:

| Core: (1) | | Cladding (2) | |
|---|---|---|---|
| $GeO_2$ | 40.5 | $SiO_2$ | 58.1 |
| BaO | 22.8 | $B_2O_3$ | 22.6 |
| $TiO_2$ | 4.8 | $Al_2O_3$ | 3.9 |
| $La_2O_3$ | 17.6 | $Na_2O$ | 15.4 |
| $ZrO_2$ | 4.7 | | |
| $Ta_2O_5$ | 3.4 | | |
| ZnO | 6.2 | | |
| ($n_D$ = 1.855) | | ($n_D$ = 1.51) | |

The Table below states a few glasses for the absorbing fibres 3 as well as the strain point (LOT) which is the temperature in °C at which the viscosity of the glass is $10^{14.6}$ poises, the annealing point (HOT) which is the temperature at which the viscosity of the glass is $10^{13.4}$ poises and the softening point (AVP) which is the temperature at which the viscosity is $10^{7.6}$ poises, and the linear coefficient of expansion (u.c) between 30° and 300°C.

posite fibres obtained were out to lengths of 100 mm and bundled in a dense pack in an ampoule having a diameter of 25 mm of borosilicate glass of the same composition as the cladding glass. The filled ampoule was evacuated, sealed and heated for ½ to 1 hour at a temperature of 700°C. The fibre-optical element obtained had a resolving power which even to the naked eye is convincingly better than an element which is obtained when starting from a combination without absorbing fibres.

In a further embodiment of manufacturing a fibre-optical element in which absorbing glass according to the invention is used, the starting material is rod-shaped core glass and a cladding glass tube, the latter being coated with a pulverulent absorbing glass, for example, by means of suspension.

What is claimed is:

1. In a fibre-optical element which is built up from a bundle of fibres comprising a transparent core portion having a high refractive index, a transparent cladding portion having a low refractive index and a light-absorbing portion, said light-absorbing portion being an improved glass consisting, in % by weight, of:

| | | | | |
|---|---|---|---|---|
| $SiO_2$ | 50 – 70 | | CaO | 0 – 5 |
| $B_2O_3$ | 0 – 25 | | MgO | 0 – 8 |
| $Li_2O$ | 0 – 2 | | BaO | 0 – 5 |
| $Na_2O$ | 0 – 15 | 5–20 | $Fe_2O_3$ | 0 – 10 } combined 5–15 |
| $K_2O$ | 0 – 10 | | $V_2O_5$ | 0 – 10 |
| $Al_2O_3$ | 2 – 4 | | $As_2O_3$ | 0 – 10 |

2. The fibre optic element as claimed in claim 1, said glass consisting, in % by weight, of:

Composition in % by weight.

| | 1 | 2 | 3 | 4 | 5 | 6 | 7 | 8 | 9 | 10 | 11 |
|---|---|---|---|---|---|---|---|---|---|---|---|
| $SiO_2$ | 60.4 | 59.9 | 61.5 | 51.9 | 59.9 | 63.2 | 51.4 | 62.4 | 59.6 | 60.2 | 63.2 |
| $B_2O_3$ | 17.0 | 16.8 | 17.3 | 20.2 | 16.8 | 17.8 | 20.0 | 1.3 | 1.2 | 1.2 | 17.8 |
| $Li_2O$ | 0.8 | 0.8 | 0.8 | — | 0.8 | 0.8 | — | — | — | — | 0.8 |
| $Na_2O$ | 0.4 | 0.4 | 0.4 | 13.7 | 0.4 | 0.4 | 13.6 | 14.4 | 13.8 | 13.9 | 0.4 |
| $K_2O$ | 7.5 | 7.4 | 7.6 | — | 7.4 | 7.9 | — | 0.7 | 0.6 | 0.6 | 7.9 |
| $Al_2O_3$ | 3.2 | 3.2 | 3.3 | 3.5 | 3.2 | 3.4 | 3.5 | 2.5 | 2.4 | 2.4 | 3.4 |
| CaO | — | — | — | — | — | — | — | 3.6 | 3.5 | 3.5 | — |
| MgO | — | — | — | — | — | — | — | 5.4 | 5.1 | 5.2 | — |
| BaO | — | — | — | — | — | — | — | 1.9 | 1.9 | 1.9 | — |
| $As_2O_3$ | — | — | — | — | — | — | — | 0.4 | 0.4 | 0.4 | — |
| $Fe_2O_3$ | 8.0 | 5.3 | — | 8.0 | 2.7 | — | 5.3 | 2.8 | 5.3 | 8.0 | 6.5 |
| $V_2O_5$ | 2.7 | 6.2 | 9.1 | 2.7 | 8.8 | 6.5 | 6.2 | 4.6 | 6.2 | 2.7 | — |
| LOT | 449 | 445 | 458 | | 446 | 454 | 486 | 435 | | | |
| HOT | 479 | 471 | 484 | | 465 | 473 | 474 | 508 | | | |
| AVP | 692 | 660 | 678 | | 672 | 668 | 632 | 676 | | | |
| u.c. | 54 | 55 | 54 | 77 | 55 | 55 | 77 | 91 | 91 | 93 | 54 |

The combination of the black glass fibres 3 at the corners and the core glass 1 with the cladding glass 2 was first drawn out of fibres having a diameter of 300 microns at a temperature of 850°C. These fibres were bundled to a diameter of 12 mm and the bundles were drawn out again so that the original fibre reached a core diameter of approximately 6.5 microns. The com-

| | | | | |
|---|---|---|---|---|
| $SiO_2$ | 50 – 65 | | CaO | 0 – 4 |
| $B_2O_3$ | 0 – 20 | | MgO | 0 – 6 |
| $Li_2O$ | 0 – 2 | | BaO | 0 – 2 |
| $Na_2O$ | 0 – 10 | combined 5—15 | $Fe_2O_3$ | 2 – 8 } combined 5–15 |
| $K_2O$ | 0 – 8 | | $V_2O_5$ | 2 – 9 |
| $Al_2O_3$ | 2 – 4 | | $As_2O_3$ | 0 – 2 |

* * * * *

PO-1050
(5/69)

UNITED STATES PATENT OFFICE
CERTIFICATE OF CORRECTION

Patent No. 3858964            Dated January 7, 1975

Inventor(s) Gertraud A.A. Piesslinger; Hubertus M.J.J. Kunnen

It is certified that error appears in the above-identified patent and that said Letters Patent are hereby corrected as shown below:

Col. 3, lines 1-7 should be corrected as follows:

| | | | | |
|---|---|---|---|---|
| $SiO_2$ | 50 - 65 | | CaO | 0 - 4 |
| $B_2O_3$ | 0 - 20 | | MgO | 0 - 6 |
| $Li_2O$ | 0 - 2 ⎫ combined | | BaO | 0 - 2 |
| $Na_2O$ | 0 - 10 ⎬ 5 - 15 | | $Fe_2O_3$ | 2 - 8 ⎫ combined |
| $K_2O$ | 0 - 8 ⎭ | | $V_2O_5$ | 2 - 9 ⎬ 5 - 15 |
| $Al_2O_3$ | 2 - 4 | | $As_2O_3$ | 0 - 2 |

Col. 3, in table entitled "Composition in % by weight, delete all figures for LOT and insert the following:

| | 1 | 2 | 3 | 4 | 5 | 6 | 7 | 8 | 9 | 10 |
|---|---|---|---|---|---|---|---|---|---|---|
| LOT | 449 | 445 | 458 | | 435 | 446 | 454 | 486 | | |

Claim 1, line 30, insert --combined-- over "5-20"

Signed and Sealed this second Day of September 1975

[SEAL]

Attest:

RUTH C. MASON
Attesting Officer

C. MARSHALL DANN
Commissioner of Patents and Trademarks